(12) United States Patent
Etzel et al.

(10) Patent No.: US 11,708,872 B2
(45) Date of Patent: Jul. 25, 2023

(54) SHIFTABLE BIDIRECTIONAL FREEWHEEL CLUTCH DEVICE, AND DRIVE DEVICE FOR A MOTOR VEHICLE COMPRISING THE CLUTCH DEVICE

(71) Applicant: Bayerische Motoren Werke Aktiengesellschaft, Munich (DE)

(72) Inventors: Michael Etzel, Munich (DE); Sebastian Liebert, Unterfoehring (DE); Ulrich Ohnemus, Hattenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/262,594

(22) PCT Filed: Sep. 26, 2019

(86) PCT No.: PCT/EP2019/076082
§ 371 (c)(1),
(2) Date: Jan. 22, 2021

(87) PCT Pub. No.: WO2020/074269
PCT Pub. Date: Apr. 16, 2020

(65) Prior Publication Data
US 2021/0285505 A1  Sep. 16, 2021

(30) Foreign Application Priority Data
Oct. 8, 2018  (DE) .............. 10 2018 124 736.2

(51) Int. Cl.
*F16D 41/16* (2006.01)
*F16D 41/14* (2006.01)
*F16D 41/12* (2006.01)

(52) U.S. Cl.
CPC .......... *F16D 41/16* (2013.01); *F16D 41/125* (2013.01); *F16D 41/14* (2013.01)

(58) Field of Classification Search
CPC ........ F16D 41/08; F16D 41/084; F16D 41/10; F16D 41/16; F16D 41/125; F16D 41/14; B60K 17/26
See application file for complete search history.

(56) References Cited

U.S. PATENT DOCUMENTS

| 2004/0159517 A1 | 8/2004 | Thomas |
| 2006/0278486 A1 | 12/2006 | Pawley et al. |

(Continued)

FOREIGN PATENT DOCUMENTS

| CN | 102678782 A | 9/2012 |
| CN | 104179818 A | 12/2014 |

(Continued)

OTHER PUBLICATIONS

International Search Report (PCT/ISA/210) issued in PCT Application No. PCT/EP2019/076082 dated Feb. 3, 2020 (three (3) pages).

(Continued)

*Primary Examiner* — Lori Wu
(74) *Attorney, Agent, or Firm* — Crowell & Moring LLP

(57) ABSTRACT

A clutch device includes at least one first blocking element, at least one second blocking element at least one first actuation element, and at least one second actuation element. The second blocking element in a second release position is arranged completely outside of a recess and in the second blocking position engaging in the second recess by passing through the second through-opening in order thereby to fix together rotationally the components in a second rotational direction opposite to the first rotational direction.

11 Claims, 5 Drawing Sheets

(56) References Cited

U.S. PATENT DOCUMENTS

| | | | |
|---|---|---|---|
| 2008/0169166 A1 | 7/2008 | Wittkopp et al. | |
| 2008/0223681 A1 | 9/2008 | Stevenson et al. | |
| 2011/0269587 A1* | 11/2011 | Papania | F16D 41/16 |
| | | | 474/148 |
| 2016/0290417 A1* | 10/2016 | Brubaker | F16D 41/14 |

FOREIGN PATENT DOCUMENTS

| | | |
|---|---|---|
| CN | 104786834 A | 7/2015 |
| EP | 1 873 416 A1 | 1/2008 |
| JP | 2011-169344 A | 9/2011 |
| WO | WO 98/49456 | 11/1998 |
| WO | WO 2014/110319 A1 | 7/2014 |
| WO | WO 2017/091433 A1 | 6/2017 |

OTHER PUBLICATIONS

German-language Written Opinion (PCT/ISA/237) issued in PCT Application No. PCT/EP2019/076082 dated Feb. 3, 2020 (six (6) pages).

German-language Decision to Grant issued in German Application No. 10 2018 124 736.2 dated Jul. 2, 2019 with English translation (17 pages).

Chinese-Office Action issued in Chinese Application No. 201980049977.3 dated Dec. 23, 2021 with English translation (19 pages).

English translation of document B2 (Document number (JP 2011-169344 A) filed on Jan. 22, 2021) (52 pages).

\* cited by examiner

SHIFTABLE BIDIRECTIONAL FREEWHEEL CLUTCH DEVICE, AND DRIVE DEVICE FOR A MOTOR VEHICLE COMPRISING THE CLUTCH DEVICE

BACKGROUND AND SUMMARY OF THE INVENTION

This disclosure relates to a clutch device, in particular for a drive train of a motor vehicle. The disclosure further relates to a drive device for a motor vehicle.

A clutch device may at least temporarily rotationally fix at least two components of a motor vehicle. The clutch device may be used, for example, as a freewheel, in particular as a shiftable freewheel, and has at least one first recess which may be provided and/or is provided on a first component of the components. The clutch device also has at least one first blocking element which may be connected and/or is connected to the second component and which is movable between at least one first blocking position and at least one first release position, in particular relative to the second component.

The clutch device further comprises at least one first actuation element which has at least one first through-opening for the first blocking element. The first actuation element can be moved relative to the first blocking element between at least one first decoupling position, in which the actuation element holds the first blocking element in the first release position, and at least one first coupling position in which the actuation element allows a movement of the first blocking element out of the first release position and into the first blocking position. The first blocking element is arranged completely outside of the first recess in the first release position and thus in the first release position does not engage in the recess. In the first blocking position the first blocking element passes through the first through-opening, so that in the first blocking position the first blocking element engages in the first recess by passing through the first through-opening. As a result, the components may be rotationally fixed and/or are fixed together in a first rotational direction.

It is an object of the present disclosure to provide a clutch device and a drive device of the type mentioned in the introduction so that a particularly advantageous operation may be implemented.

This and other objects are achieved according to the disclosure by the inventive clutch device disclosed herein.

A first feature of the disclosure relates to a clutch device for at least temporarily rotationally fixing at least two components, in particular of a drive train and/or of a drive device of a motor vehicle. The clutch device comprises at least one first recess which may be provided and/or is provided on a first component of the components. For example, the first recess may be fixed and/or is fixed rotationally to the first component. The clutch device also comprises at least one first blocking element which is able to be connected and/or is connected to the second component. The first blocking element can be moved, in particular can be pivoted, between at least one first blocking position and at least one first release position, in particular relative to the second component. The clutch device further comprises at least one first actuation element which has at least one first through-opening for the first blocking element. The first actuation element can be moved, in particular can be rotated, relative to the first blocking element between at least one first decoupling position in which the actuation element holds the first blocking element in the first release position, and at least one first coupling position in which the actuation element allows a movement of the first blocking element out of the first release position and into the first blocking position.

In other words, in the first release position the first actuation element holds and/or secures the first blocking element in the first release position, wherein in the first release position the first blocking element is arranged completely outside of the first recess and thus does not engage in the first recess.

If the first actuation element is moved from the decoupling position into the coupling position, the first actuation element allows a movement of the first blocking element from the release position into the blocking position. In other words, therefore, the first blocking element moves from the release position into the blocking position, wherein for example in the first blocking position the first blocking element passes through the first through-opening and simultaneously engages in the first recess. In other words, in the first blocking position the first blocking element engages in the first recess by passing through the first through-opening, whereby the components may be fixed and/or are fixed rotationally together by means of the first blocking element in a first rotational direction. If, for example, the first actuation element is in the coupling position, therefore, the first blocking element is in the first blocking position so that the components are rotationally fixed together in the first rotational direction and thus may not rotate relative to one another in the first rotational direction.

In order to be able to implement a particularly advantageous and, in particular, efficient and thus low energy-consuming, in particular low fuel-consuming, operation, in particular of the aforementioned drive device and/or of the drive train, the inventive clutch device has at least one second recess which may be provided and/or is provided on the first component, in particular in a rotationally fixed manner. For example, the second recess is fixed and/or may be fixed rotationally to the first component.

According to the disclosure, the clutch device also has at least one second blocking element which may be connected and/or is connected to the second component, and which is movable, in particular pivotable, between at least one second blocking position and at least one second release position, in particular relative to the second component. Moreover, the inventive clutch device has at least one second actuation element which has at least one second through-opening for the second blocking element. The second actuation element is movable between at least one second decoupling position holding the second blocking element in the second release position and at least one second coupling position relative to the second blocking element, allowing a movement of the second blocking element from the second release position into the second blocking position. In other words, in the second decoupling position the second actuation element holds and/or secures the second blocking element in the second release position.

If, for example, the second actuation element is moved from the decoupling position into the coupling position, the second actuation element allows a movement of the second blocking element from the second release position into the second blocking position and/or the second blocking element then moves from the second release position into the second blocking position. In this case, in the second release position the second blocking element is arranged completely outside of the recesses, so that in the second release position the second blocking element does not engage in the recesses. In the second blocking position, however, the second blocking element engages in the second recess by passing through the second through-opening. In other words, in the second blocking position the second blocking element passes through the second through-opening and simultaneously engages in the second recess, whereby the components may be fixed and/or are fixed together rotationally in a second rotational direction opposite the first rotational direction. Whilst, for example, in the second blocking position the second blocking element passes through the second through-opening and engages in the second recess, the second blocking element is arranged, for example, completely outside of the first recess. The first blocking element is arranged, for example, in the first release position completely outside of the recesses and thus does not engage in the recesses. Whilst, for example, in the first blocking position the first blocking element passes through the first through-opening and simultaneously engages in the first recess, in the first blocking position the first blocking element is arranged outside of the second recess.

Preferably, the first blocking element is movable from the first blocking position into the first release position by the first actuation element being moved, in particular rotated, from the coupling position into the decoupling position. Moreover, preferably the second blocking element is movable from the second blocking position into the second release position, by the second actuation element being moved, in particular rotated, out of the second coupling position into the second decoupling position. Thus the respective actuation element, for example, is one respective selector plate or one respective selector ring, wherein one respective movement of the respective blocking element between the respective release position and the respective blocking position is able to be effected by means of the respective actuation element as appropriate. As a result, for example, the components may be rotationally fixed together in the first rotational direction and/or in the second rotational direction as appropriate.

If, for example, both blocking elements are simultaneously in the respective release positions, the components may rotate relative to one another, for example, both in the first rotational direction and in the second rotational direction. If, for example, both blocking elements are simultaneously in the respective blocking positions, the components are rotationally fixed together both in the first rotational direction and in the second rotational direction. If, for example, the first blocking element is in the first blocking position, whilst the second blocking element is in the second release position, the components may rotate relative to one another in the second rotational direction, for example, wherein the components are rotationally fixed together in the first rotational direction. If, for example, the first blocking element is in the first release position, whilst the second blocking element is in the second blocking position, the components may move relative to one another in the first rotational direction, for example, wherein the components are rotationally fixed together in the second rotational direction. As a result, a particularly appropriate and thus efficient operation may be implemented. In particular, it is possible to hold the first blocking element and/or the second blocking element in the respective release position as appropriate so that, for example, when a relative rotation is desired between the components in the at least one of the rotational directions the first component does not come into contact with the respective blocking element in the release position.

In a conventional clutch device, for example, the second actuation element is not provided. If, for example, the first blocking element is held by means of the first actuation element in the first release position, the clutch device may consequently function as a freewheel, for example, in particular as a shiftable freewheel which—since the first blocking element is held, for example, by means of the first actuation element in the first release position—allows a relative rotation between the components in the first rotational direction but blocks a relative rotation between the components in the second rotational direction opposite the first rotational direction, since for example the second blocking element, which is in particular spring-loaded, may come into engagement with the second recess in order to avoid thereby a relative rotation of the components in the second rotational direction. In this case, however, the second blocking element allows a relative rotation between the components in the first rotational direction, since for example with a relative rotation to the second component in the first rotational direction the first component then comes into contact with the second blocking element and slides thereon, in particular such that for example when the second recess overlaps the second blocking element, the second blocking element temporarily comes into the second blocking position and as a result temporarily engages in the second recess, whereupon however the second blocking element is moved by the first component out of the second recess and as a result is moved from the second blocking position into the second release position. Thus conventionally it leads to a contact between the first component and the second blocking element, whereby it may lead to unpleasant noises, in particular in the form of clicking noises which, for example, exist in conventional freewheels for bicycles. Moreover, due to the aforementioned contact between the first component and the second blocking element it generally leads to friction between the second blocking element and the first component, wherein this friction impairs the efficiency of the clutch device and thus the drive device and/or the drive train as a whole.

Since according to the disclosure not only the first actuation element but also the second actuation element are used, so that the second blocking element may be held as appropriate in the release position by means of the second actuation element, the inventive clutch device may function in the manner of a freewheel, in particular in the manner of a shiftable freewheel, wherein however with relative rotations between the components in the first rotational direction, for example, undesired contacts between the first component and the second blocking element may be avoided, in particular such that the second blocking element is held by means of the second actuation element in the second release position. As a result, the production of undesired noises may be avoided. Moreover, undesired friction between the first component and the second blocking element may be avoided so that an operation which is particularly optimal in terms of efficiency and/or efficient may be implemented.

In order to implement a particularly advantageous and efficient operation, in an advantageous embodiment of the disclosure it is provided that the actuation elements are fixed together, in particular rotationally fixed, and as a result movable, in particular rotatable, together between the respective coupling position and the respective decoupling position. The common movement and/or mobility of the actuation elements between the respective coupling position and the respective decoupling position is to be understood, in particular, as the actuation elements being movable and/or moved simultaneously between the respective coupling position and the respective decoupling position, due to the connection thereof. As a result, for example, a regulating and/or control effort for the clutch device may be kept particularly low.

In a further embodiment of the disclosure, an actuator which is common to the actuation elements is provided, the actuation elements being movable and/or moved thereby together and/or simultaneously between the respective coupling position and the respective decoupling position. As a result, the number of parts and the weight, the costs and the constructional space requirement of the clutch device may be kept particularly low since for both actuation elements a single actuator which is common to the actuation elements is provided and is sufficient for moving the actuation elements.

In order to implement an advantageous and efficient operation, in a further embodiment of the disclosure it is provided that the first blocking element is arranged in the first release position completely outside of the second recess.

A further embodiment is characterized in that the recesses are arranged on opposite sides. As a result, for example, the constructional space requirement of the clutch device, in particular in the axial direction of the components, may be kept particularly low, so that a particularly efficient operation may be implemented. One of the sides, for example, is a first axial front face of the first component, wherein for example, a second of the sides is a second axial front face of the first component, wherein the axial front faces in the axial direction of the first component face away from one another.

In order to keep the constructional space requirement particularly low, it is preferably provided that the first recess is opened and/or is open in a first direction and the second recess is opened and/or is open in a second direction opposite the first direction. Thus the first blocking element, for example, may engage in the second direction in the first recess, wherein, for example, the second blocking element may engage in the first direction in the second recess.

In this case, it has been shown to be particularly advantageous if the blocking elements are arranged on opposite sides, whereby the constructional space requirement may be kept particularly low. Preferably, the blocking elements and the recesses are arranged offset to one another in the first rotational direction and/or in the second rotational direction, whereby in particular the axial constructional space requirement may be kept to a particularly low level.

A further embodiment is characterized in that the clutch device has a first operating state and/or is shiftable into a first operating state. In the first operating state the actuation elements are simultaneously in the respective decoupling positions, so that the blocking elements are held simultaneously by means of the actuation elements in the respective release positions. The components, therefore, may rotate relative to one another in the first operating state, for example both in the first rotational direction and in the second rotational direction.

In a further embodiment of the disclosure, the clutch device has a second operating state and/or is shiftable into a second operating state. In the second operating state the first actuation element is in the first coupling position, whilst the second actuation element is in the second coupling position. As a result, the first blocking element is in the first release position whilst the second blocking element is in the second blocking position.

A further embodiment is characterized in that the clutch device has a third operating state and/or is shiftable into a third operating state. In the third operating state the actuation elements are simultaneously in the respective coupling positions so that the blocking elements are simultaneously in the respective blocking positions.

In particular, the second operating state, for example, may be implemented by the through-openings having lengths and/or sizes or dimensions which are different from one another running in the respective rotational direction, whereby for example the second blocking element may pass through the through-opening and thus may engage in the second recess, whilst the first blocking element is held by means of the first actuation element in the first release position.

In the respective decoupling position, the respective blocking element is held, for example, by means of the respective actuation element in the respective release position by the respective blocking element, in particular in the axial direction of the components, being supported or being able to be supported on one respective wall of the respective actuation element.

A second feature of the disclosure relates to a drive device and/or a drive train for a motor vehicle, in particular for an automobile, such as for example a passenger motor vehicle. The drive device comprises at least one first component and at least one second component. Moreover, the drive device comprises at least one clutch device for at least temporarily rotationally fixing together the components, wherein the clutch device is preferably configured as an inventive clutch device according to the first feature of the disclosure.

The clutch device has at least one first recess provided on the first component and at least one first blocking element which is connected to the second component and which is movable between at least one first blocking position and at least one first release position. Moreover, the clutch device has at least one first actuation element which has at least one first through-opening for the first blocking element and which is movable, in particular rotatable, relative to the first blocking element between at least one first decoupling position holding the first blocking element in the first release position and at least one first coupling position allowing a movement of the first blocking element from the first release position into the first blocking position. The first blocking element in the first release position is arranged completely outside of the first recess. In the first blocking position the first blocking element engages in the first recess by passing through the first through-opening, whereby the components are rotationally fixed together in a first rotational direction.

In order to be able to implement an operation of the drive device which is particularly advantageous and in particular efficient and thus optimal in terms of efficiency, it is provided according to the disclosure that the drive device, in particular the clutch device, has at least one second recess provided on the first component and at least one second blocking element which is connected to the second component and which is movable between at least one second blocking position and at least one second release position. Moreover, the drive device, in particular the clutch device, has at least one second actuation element which has at least one second through-opening for the second blocking element and which is movable, in particular rotatable, relative to the second blocking element between at least one second decoupling position holding the second blocking element in the second release position and at least one second coupling position allowing a movement of the second blocking element from the second release position into the second blocking position. The second blocking element in the second release position is arranged completely outside of the recess. In the second blocking position the second blocking element engages in the second recess by passing through the second through-opening, whereby the components are rotationally fixed together in a second rotational direction opposite the first rotational direction. Advantages and advantageous embodiments of the first feature of the disclosure are to be regarded as advantages and advantageous embodiments of the second feature of the disclosure and vice versa.

Finally, it has proved particularly advantageous if the second component is a housing and the first component is a shaft at least partially accommodated in the housing, in particular of a transmission of the drive device. The shaft is, for example, a planet carrier and/or is rotationally fixed to a planet carrier of a planetary transmission. If, for example, both blocking elements are simultaneously in the respective blocking positions, for example, the shaft is secured fixedly in terms of rotation to the housing, so that the shaft may not rotate relative to the housing. Depending on whether the first blocking element and/or the second blocking element are in the respective blocking position, for example, the shaft may rotate relative to the housing in the first rotational direction and/or in the second rotational direction, whilst for example the shaft is secured against a relative rotation to the housing in the second rotational direction and/or in the first rotational direction by means of the clutch device. As a result, a particularly appropriate operation of the drive device may be implemented.

Further details of the disclosure are disclosed in the following description of a preferred exemplary embodiment with the accompanying drawings, in which:

DETAILED DESCRIPTION OF THE DRAWINGS

Figure 1:
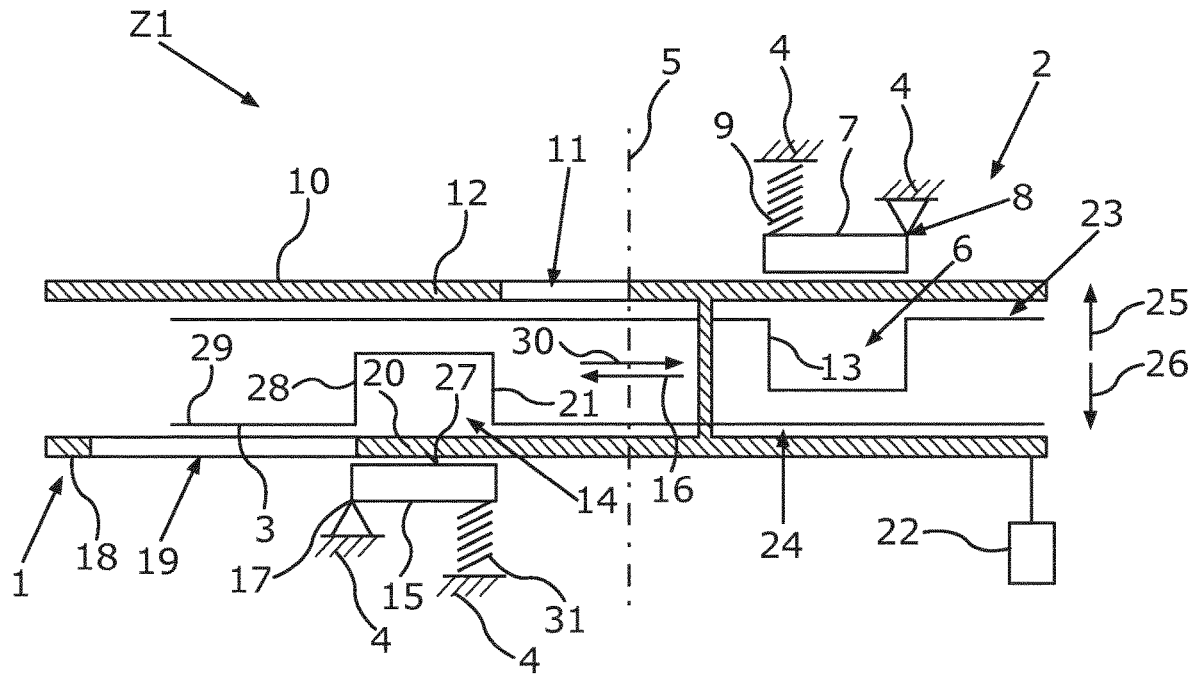
FIG. 1 shows in a detail a schematic plan view of an inventive clutch device which is in a first operating state.

Elements which are identical or functionally identical are provided with identical reference numerals in the figures.

FIG. 1 shows in a detail in a schematic plan view a clutch device 1 of a drive device 2 of a motor vehicle, which is also able to be identified in a detail in FIG. 1, in particular of an automobile, such as for example a passenger motor vehicle. The passenger motor vehicle comprises a drive train, the passenger motor vehicle being able to be driven thereby. The drive train comprises in this case the drive device 2 which is, for example, a transmission or comprises such a transmission. The transmission is configured, for example, as an automatic transmission, in particular as a converter-automatic transmission. The drive train also comprises, for example, at least one drive motor which may not be identified in the figures and which has an output shaft which is configured, for example, as a crankshaft. The drive motor is configured, for example, as an internal combustion engine and in this case, in particular, as a reciprocating piston internal combustion engine and may provide via its output shaft torques for driving the motor vehicle. The torques are introduced, for example, into the transmission and/or into the drive device 2, whereby the transmission and/or the drive device 2 is driven. In particular, for example, wheels of the motor vehicle and thus the motor vehicle as a whole may be driven by the drive motor via the drive device 2. By means of the drive device 2, in particular by means of the transmission, for example, the respective torques provided by the drive motor are converted into correspondingly different torques. To this end, the drive device 2, in particular the transmission, comprises, for example, a plurality of gears and/or gear stages which differ from one another in their respective gear ratios.

The respective gears and/or gear stages may, for example, be engaged and/or activated and disengaged and/or deactivated. During the course of a gear change, which is also denoted as shifting, for example, a first of the gears is deactivated and a second of the gears is activated. For example, in the course of an upshift, the initially activated first gear is deactivated and the initially deactivated second gear is activated. In the course of a downshift, for example, the initially activated second gear is deactivated and the initially deactivated first gear is activated. In this case, for example, the first gear has a first gear ratio, wherein the second gear, for example, has a second gear ratio which is lower relative to the first gear ratio.

The drive device 2 in this case comprises a first component in the form of a shaft 3 which, for example, is a planet carrier or is rotationally fixed to such a planet carrier of a planetary gear of the drive device 2. Moreover, the drive device 2 comprises a second component in the form of a housing 4, shown particularly schematically in the figs, wherein the shaft 3 is at least partially, in particular at least substantially or completely, received in the housing 4. In FIG. 1 a rotational axis 5 which is also denoted as the transmission axis may also be identified. The rotational axis 5 coincides with the axial direction of the drive device 2, and thus in particular of the shaft 3, wherein for example in at least one operating state of the clutch device 1 the shaft 3 is rotatable and/or is rotated about the rotational axis 5 relative to the housing 4, in particular when the drive device 2, in particular the shaft 3, is driven. The drive device 2, in particular the transmission, for example is driven by the drive motor in a traction mode of the drive motor, wherein for example the drive motor in its traction mode drives the aforementioned wheels via the drive device 2. It is also conceivable that the drive device 2, in particular the transmission, is driven in a coasting mode of the drive motor by the aforementioned wheels, wherein in the coasting mode the wheels drive the drive motor via the drive device 2, in particular via the transmission. The drive motor driving the wheels via the transmission is to be understood, in particular, as the drive motor driving the wheels via the transmission by means of the output shaft. The wheels driving the drive motor via the transmission in the coasting mode is to be understood, in particular, as the wheels driving the output shaft via the drive device 2 in the coasting mode.

The clutch device 1, as is described hereinafter in more detail, may function as a freewheel, in particular a shiftable freewheel, and to this end has at least one first recess 6 provided on the shaft 3. Moreover, the clutch device 1 has at least one first blocking element 7 which is connected to the housing 4 and which is also denoted as a first expansion element. The first blocking element 7 in this case is movable between at least one first release position shown in FIG. 1 and at least one first blocking position shown in FIG. 3 relative to the components, wherein in the exemplary embodiment illustrated in the figures the blocking element 7 is pivotable about a pivot axis 8 relative to the components between the first release position and the first blocking position. The rotational axis 5 runs, for example, perpendicular to a first plane, wherein the pivot axis 8 runs perpendicular to a second plane and wherein the planes run perpendicular to one another. Moreover, the blocking element 7 is held fixedly in terms of rotation on the housing 4, for example relative to the rotational axis 5, so that whilst the blocking element 7 may rotate and/or pivot about the pivot axis 8 relative to the housing 4, the blocking element 7 may not rotate about the rotational axis 5 relative to the housing 4. As a result, for example, first torques acting about the rotational axis 5 may be transmitted from the shaft 3 via the blocking element 7 to the housing 4 when, for example, the blocking element 7 is in its first blocking position which is described hereinafter in further detail.

Assigned to the blocking element 7 is at least one spring element 9 which, on the one hand, is supported indirectly, in particular directly, on the housing 4 and, on the other hand, at least indirectly, in particular directly, on the blocking element 7. In this case, for example, the spring element 9 in the first release position is more highly tensioned than in the first blocking position so that at least in the first release position the spring element 9 provides a first spring force which acts on the first blocking element 7. As is described in more detail hereinafter, for example, by means of the first spring force the first blocking element 7 is movable from the first release position into the first blocking position and, in particular, may be held in the first blocking position.

The clutch device 1 also has at least one first actuation element 10 which is configured, for example, as a first selector plate or first selector ring. The first actuation element 10 has at least one first through-opening 11 which is assigned to the first blocking element 7 and which passes through, for example in particular completely, a first wall 12 of the first blocking element 7 in the axial direction of the shaft 3.

Figure 2:
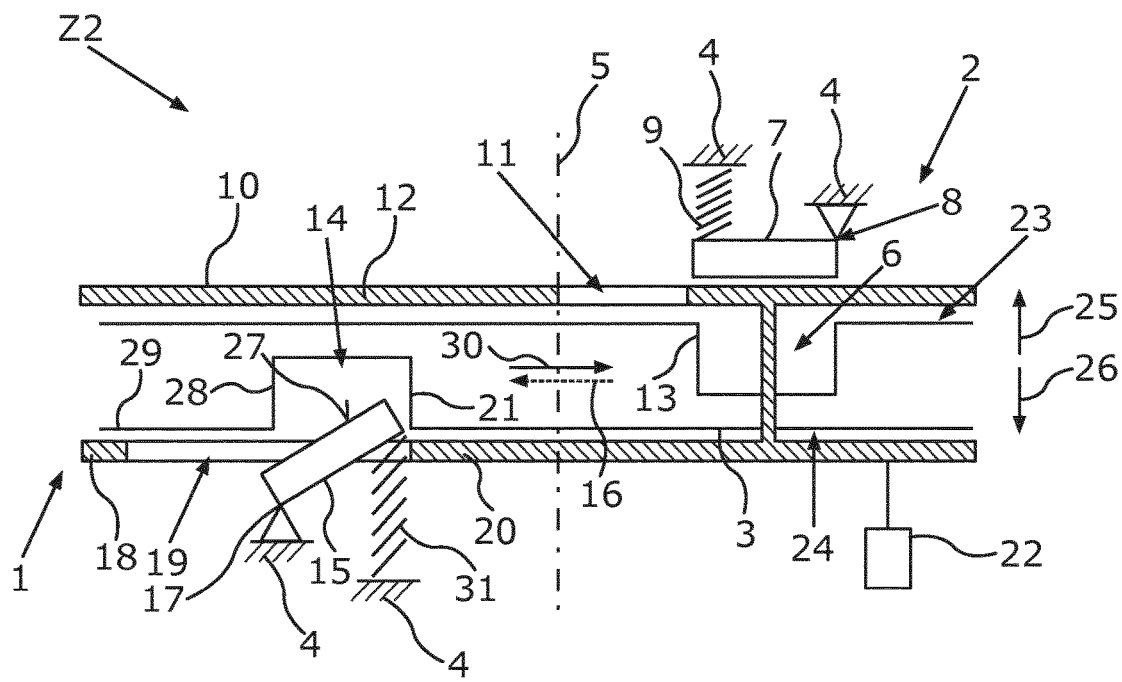
FIG. 2 shows in a detail a schematic plan view of the inventive clutch device which is in a second operating state.
Figure 3:
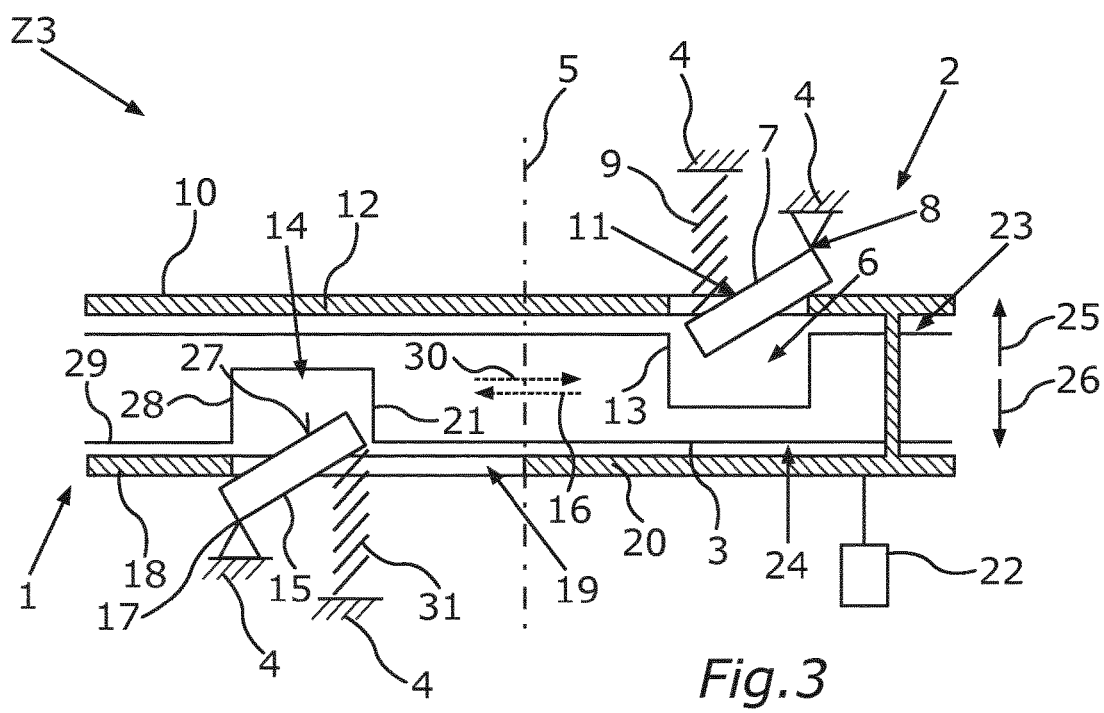
FIG. 3 shows in a detail a schematic plan view of the inventive clutch device which is in a third operating state.

The first actuation element 10 is movable relative to the blocking element 7 and, in particular, relative to the housing 4 between at least one first decoupling position holding and/or securing the first blocking element 7 in the first release position and shown in FIGS. 1 and 2, and at least one first coupling position allowing a movement of the first blocking element 7 from the first release position into the first blocking position, wherein the first coupling position is shown in FIG. 3. In this case, the first actuation element 10 is rotatable about the rotational axis 5 relative to the blocking element 7 and relative to the housing 4 between the first coupling position and the first decoupling position.

The first blocking element 7 in the first release position is arranged completely outside of the first recess 6 and thus does not engage in the recess 6. In the first blocking position, however, the blocking element 7 passes through the first through-opening 11 and thus engages in the corresponding first recess 6 by passing through the first through-opening 11, whereby the components (shaft 3 and housing 4) are rotationally fixed together by means of the first blocking element 7, in a first rotational direction illustrated in FIG. 1 by an arrow 30. As the blocking element 7 in the first blocking position engages in the recess 6, the aforementioned first torques, which act about the rotational axis 5 and would rotate the shaft 3 in the first rotational direction relative to the housing 4, are transmitted, in particular via a wall 13 of the shaft 3 at least partially defining the recess 6, to the blocking element 7 and thereby to the housing 4, and are supported on the housing 4 so that the shaft 3 in the first blocking position is secured by means of the blocking element 7 against a relative rotation to the housing 4 in the first rotational direction.

In order to be able to implement an operation of the drive device 2 which is particularly advantageous and in particular efficient and/or optimal in terms of efficiency, the clutch device 1 has at least one second recess 14 provided on the shaft 3 and at least one second blocking element 15 connected to the housing 4, which is also denoted as the second expansion element. The second blocking element 15 in this case is held fixedly in terms of rotation on the housing 4 relative to the rotational axis 5 and thus may not rotate about the rotational axis 5 relative to the housing 4 so that—as described in more detail hereinafter—second torques acting about the rotational axis 5 and opposite the first torques may be transmitted from the shaft 3 via the blocking element 15 to the housing 4 and may be supported on the housing 4, so that, for example, the shaft 3 is alternatively or additionally secured and/or may be secured against a relative rotation to the housing 4 in a second rotational direction opposite the first rotational direction and illustrated in FIG. 1 by an arrow 16.

In this case, the second blocking element 15 is also movable between at least one second blocking position shown in FIGS. 2 and 3 and at least one second release position shown in FIG. 1, in particular relative to the components and/or relative to the housing 4. To this end, the blocking element 15 is pivotable about a second pivot axis 17 relative to the housing 4 between the second release position and the second blocking position. In this case, for example, the second pivot axis 17 runs perpendicular to the second plane. For example, the pivot axes 8 and 17 run parallel to one another. The blocking element 15, therefore, may rotate about the pivot axis 17 relative to the housing 4 but the blocking element 15 is not able to rotate about the rotational axis 5 relative to the housing 4.

The clutch device 1 also has a second actuation element 18 which is assigned to the blocking element 15 and which is configured, for example, as the second selector plate and/or as the second selector ring. The second actuation element 18 has a second through-opening 19 which is assigned to the second blocking element 15 and which, for example, passes through, in particular completely, a wall 20 of the actuation element 18, in particular in the axial direction of the shaft 3.

Moreover, the second actuation element 18 is movable, in particular pivotable about the pivot axis 17, relative to the second blocking element 15 between at least one second decoupling position holding the second blocking element 15 in the second release position and illustrated in FIG. 1 and at least one second coupling position allowing a movement of the second blocking element 15 from the release position into the second blocking position and shown in FIGS. 2 and 3. The second blocking element 15 is arranged in the second release position completely outside of the recesses 6 and 14, wherein the blocking element 7 in the first release position is arranged completely outside of the recesses 6 and 14. In the second blocking position, however, the second blocking element 15 passes through the corresponding through-opening 19 and simultaneously engages in the second recess 14, whereby the components (shaft 3 and housing 4) are rotationally fixed together in the aforementioned second rotational direction opposite the first rotational direction. Whilst, for example, the blocking element 7 is in the first blocking position and simultaneously engages in the recess 6, the blocking element 7 is arranged completely outside of the recess 14 and thus does not engage in the recess 14. Similarly, the blocking element 15 is arranged completely outside of the recess 6 and thus does not engage in the recess 6, whilst the blocking element 15 is in the second blocking position and thus engages in the recess 14.

Assigned to the blocking element 15 is a second spring element 31 which is supported, for example, on the one hand indirectly, in particular directly, on the housing 4, and on the other hand indirectly, in particular directly, on the blocking element 15. The spring element 31 in the second release position is more highly tensioned than in the first release position and thus at least in the second release position provides a second spring force which acts on the second blocking element 15. By means of this second spring force, for example, the second blocking element 15 may be moved from the second release position into the second blocking position and, in particular, may be held in the second blocking position.

From FIG. 1 it may be identified that the respective recess 6 and/or 14 is formed, for example, by the shaft 3 itself. Alternatively, it is conceivable that the recesses 6 and 14 are formed, for example, by a component of the clutch device 1, wherein this component, for example, is a component which is configured separately from the shaft 3 and which is fixed and/or able to be fixed rotationally to the shaft 3.

It is also conceivable that the respective blocking element 7 and/or 15 is held at least substantially directly on the housing 4. Alternatively, it is conceivable that the respective blocking element 7 and/or 15 is held, for example, on a second component of the clutch device 1, wherein for example the second component may be a second component which is configured separately from the housing 4 and which is able to be fixed and/or fixed rotationally to the housing 4.

In the respective decoupling position of the respective actuation element 10 and/or 18, the respective blocking element 7 and/or 15 is held by means of the respective actuation element 10 and/or 18 in the respective release position such that, for example, in the axial direction of the shaft 3 the respective blocking element 7 and/or 15 is supported and/or bears against the respective wall 12 and/or 20 in the direction of the shaft 3. As a result, for example, in spite of the circumstance that the respective spring force acts on the respective blocking element 7 and/or 15, the respective blocking elements 7 and/or 15 are not moved by means of the respective spring force into the respective recess 6 and/or 14. In other words, for example, in the respective decoupling position in the axial direction toward the shaft 3 the respective blocking element 7 and/or 15 is at least partially, in particular at least substantially or completely, overlapped by the respective wall 12 and/or 20, whereby the respective blocking element 7 and/or 15 is secured against a movement into the blocking position.

In order to allow a movement of the respective blocking element 7 and/or 15 effected by the respective spring force, from the release position into the blocking position, the respective actuation element 10 and/or 18 is moved out of the respective decoupling position into the respective coupling position. In the respective coupling position, the respective through-opening 11 and/or 19 at least partially, in particular at least substantially or completely, overlaps the respective blocking element 7 and/or 15, so that then the respective blocking element 7 and/or 15 may be moved by the respective spring force at least partially through the respective through-opening 11 and/or 19 and as a result may engage in the respective recess 6 and/or 14.

From FIG. 2 it may be identified particularly clearly that, for example, when the blocking element 15 is in the second blocking position, the aforementioned second torques are transmitted from the shaft 3 to the blocking element 15, in particular via at least one wall 21 of the shaft 3 at least partially defining the recess 14, and thereby to the housing 4 and, for example, may be supported on the housing 4, whereby a relative rotation between the shaft 3 and the housing 4 is prevented and/or avoided through the second rotational direction illustrated by the arrow 16.

In order to move the respective blocking element 7 and/or 15 from the respective blocking position into the respective release position, the respective actuation element 10 and/or 18 is moved from the respective coupling position into the respective decoupling position, in particular rotated about the rotational axis 5 relative to the housing 4. During this movement the respective actuation element 10 and/or 18 slides on the blocking element 7 and/or 15 initially located in the respective blocking position, whereby for example the respective blocking element 7 and/or 15 is successively moved out of the blocking position into the respective release position. Alternatively or additionally, it is conceivable that by means of at least one adjusting member the respective blocking element 7 and/or 15 is actively movable and/or is moved out of the respective blocking position into the respective release position. In order, for example, to move the respective blocking element 7 and/or 15 from the respective blocking position into the respective release position and the respective actuation element 10 and/or 18 from the respective coupling position into the respective decoupling position, for example, initially the respective blocking element 7 and/or 15 initially located in the blocking position is moved by means of the aforementioned adjusting member out of the respective blocking position into the respective release position, whereupon for example the respective actuation element 10 and/or 18 is moved and/or rotated out of the respective coupling position into the respective decoupling position.

From FIGS. 1 to 3 it may be identified that the actuation elements 10 and 18 are rotationally fixed together and, as a result, are movable together and/or simultaneously between the respective coupling position and the respective decoupling position. To this end, for example, the clutch device 1 comprises an actuator 22, shown particularly schematically in the figures and common to the actuation elements 10 and 18, by means of which the actuation elements 10 and 18 are movable, in particular are rotatable, and/or are moved, in particular rotated, together and/or simultaneously between the respective coupling position and the respective decoupling position. As a result, the number of parts, the constructional space requirement, the weight and the costs of the clutch device 1 may be kept particularly low, since both actuation elements 10 and 18 may be moved by means of just one actuator 22.

In particular, in order to keep the axial constructional space requirement particularly low, the recesses 6 and 14 are arranged on opposite sides. In this case, the recess 6 is arranged at or on a first front face 23 of the shaft 3, whilst the recess 14 is arranged on and/or at a second axial front face 24 of the shaft 3. The axial front faces 23 and 24 in this case are remote from one another in the axial direction of the shaft 3. In this case the recess 6 is opened and/or open in a first direction illustrated by an arrow 25 and facing the blocking element 7, wherein the recess 14 is opened and/or open in a second direction opposite the first direction and illustrated by an arrow 26 and facing the blocking element 15. Thus, for example, the blocking element 7 may engage in the second direction in the recess 6, wherein the blocking element 15 may engage in the first direction in the recess 14. In this case, the blocking elements 7 and 15 are arranged on opposite sides, wherein for example the blocking element 7 is arranged on the axial front face 23 and the blocking element 15 is arranged on the axial front face 24 of the shaft 3.

FIG. 1 illustrates a first operating state Z1 of the clutch device 1. In the first operating state the actuation elements 10 and 18 are simultaneously in the respective decoupling positions, so that the blocking elements 7 and 15 are held by means of the actuation elements 10 and 18 simultaneously in the respective release positions. Thus in the first operating state the blocking elements 7 and 15 are simultaneously in the respective release positions. As a result, relative rotations between the shaft 3 and the housing 4 are allowed both in the first rotational direction (arrow 30) and in the second rotational direction (arrow 16). In other words, in the first operating state the shaft 3 may rotate both in the first rotational direction and in the second rotational direction relative to the housing 4 about the rotational axis 5.

FIG. 2 shows a second operating state Z2 of the clutch device 1. In the second operating state the first actuation element 10 is in the first decoupling position whilst the second actuation element 18 is in the second coupling position. Thus the first blocking element 7 is in the first release position whilst the second blocking element 15 is in the second blocking position. In the second operating state the clutch device 1 functions—as indicated above—as a freewheel, since the clutch device 1 and/or the freewheel allows a relative rotation between the shaft 3 and the housing 4 in the first rotational direction (arrow 30) but blocks and/or prevents a relative rotation between the shaft 3 and the housing 4 in the second rotational direction (arrow 16). The clutch device 1 in this case may function as a shiftable freewheel and/or the aforementioned freewheel is a shiftable freewheel since the clutch device 1 is shiftable between the first operating state Z1 and the second operating state Z2.

Moreover, FIG. 3 shows a third operating state Z3 of the clutch device 1, wherein the clutch device 1 is shiftable between the operating states Z1, Z2 and Z3 as appropriate. In the third operating state Z3 the actuation elements 10 and 18 are simultaneously in the respective coupling positions so that the blocking elements 7 and 15 are simultaneously in the respective blocking positions. As a result, both relative rotations between the shaft 3 and the housing 4 in the first rotational direction and relative rotations between the shaft 3 and the housing 4 in the second rotational direction are avoided and/or prevented by the clutch device 1.

In the first operating state Z1 the blocking elements 7 and 15 are opened so that no drag torque occurs and/or may be used. In the second operating state, for example, the shaft 3 is blocked for the traction mode of the drive motor in the first gear of the transmission.

In the second operating state Z2 the clutch device 1 allows relative rotations between the shaft 3 and the housing 4 in the first rotational direction such that whilst when the shaft 3 rotates in the first rotational direction relative to the housing 4 and relative to the blocking element 15 the blocking element 15 may pass into the second blocking position and thus may engage in the recess 14, the blocking element 15 has a surface 27, for example, which in the second blocking position, when the shaft 3 moves about the rotational axis 5 relative to the housing 4 and relative to the blocking element 15, comes into contact with the shaft 3, in particular with a wall 28 of the shaft 3 at least partially defining the recess 14 and opposite the wall 21, for example, when the blocking element 15 engages in the recess 14. If the shaft 3 then rotates in the first rotational direction relative to the housing 4 and relative to the blocking element 15, the shaft 3, in particular the wall 28, may slide on the surface 27. As a result, the blocking element 15 which is initially in the second blocking position is moved, in particular is pushed, by the shaft 3, in particular via the wall 28, in the direction of and/or into the second release position, so that the blocking element 15 is moved out of the recess 14 and then subsequently for example may slide on the shaft 3, in particular on a wall 29 of the shaft 3 adjoining the wall 28. Overall, for example, it may be identified that movements of the respective blocking element 7 and/or 15 from the respective blocking position are possible into the or in the direction of the respective release position but the respective blocking element 7 and/or 15 may not be moved beyond the respective blocking position. As a result, the clutch device 1 may function as the aforementioned freewheel and at the same time allow or avoid relative movements between the shaft 3 and the housing 4 in the described manner as appropriate.

For setting the first operating state Z1, the actuation elements 10 and 18 are moved, for example, by means of the actuator 22 into a first position. For setting the operating state Z2, the actuation elements 10 and 18 are moved, for example, by means of the actuator 22 into a second position which is different from the first position. For setting the third operating state Z3, the actuation elements 10 and 18 are moved, in particular rotated, for example, by means of the actuator 22 into a third position which is different from the first position and from the second position.

By the use of the two actuation elements 10 and 18, for example, it is possible, in particular in the first operating state Z1, to hold both blocking elements 7 and 15 simultaneously in the release position. As a result, undesired contacts between the shaft 3 and the blocking elements 7 and 15 and the resulting noise may be avoided. Moreover, undesired friction between the shaft 3 and the blocking elements 7 and 15 may be avoided thereby, whereby an operation which is particularly efficient and thus optimal in terms of efficiency may be implemented.

Figure 4:
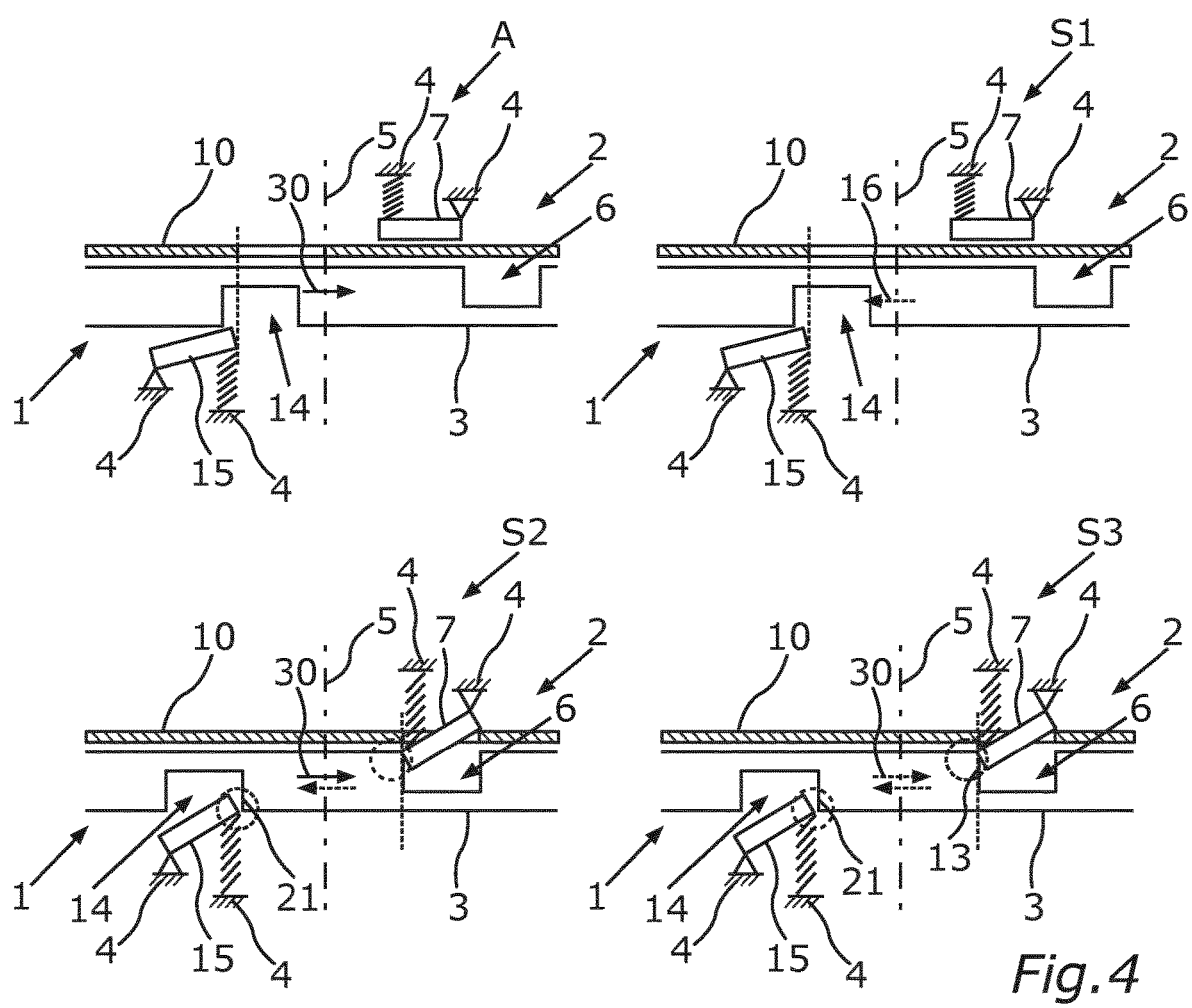
FIG. 4 shows in detail schematic plan views of the clutch device, wherein a method for operating a drive device of a motor vehicle comprising the clutch device is described with reference to FIG. 4.

With reference to FIG. 4, a method for operating the drive device 2 and/or the clutch device 1 is illustrated. In particular with reference to FIG. 4, a push downshift from the second gear or from a correspondingly higher gear into the first gear and/or into a correspondingly lower gear is illustrated. In order to provide a better overview, the actuation element 18 is not shown in FIG. 4. In the aforementioned push downshift, for example, an overrun mode of the clutch device 1, in particular of the blocking element 15, is provided, wherein in the context of the overrun mode relative rotations between the shaft 3 and the housing 4 may be allowed in the first rotational direction. In this case, in the described manner the shaft 3 comes into contact with the blocking element 15 which allows this relative rotation between the shaft 3 and the housing 4 in the first direction. If the actuation element 18 is also used, these contacts between the shaft 3 and the blocking element 15 may be avoided. In FIG. 4, for example, an initial state A is illustrated, starting from which the push downshift is carried out. In the initial state A, the aforementioned overrun mode of the blocking element 15 is present. Such a push downshift is to be understood as a shifting from the second and/or higher gear into the first and/or lower gear, whilst for example the drive motor is in coasting mode.

In a first step S1, for example, a brake of the transmission is opened and a positive torque, also denoted as the engine torque of the internal combustion engine, is set so that, for example, the internal combustion engine provides via its output shaft a positive torque which is introduced, for example, into the transmission. The shaft 3 is braked by the positive engine torque, which is illustrated in FIG. 4 by the arrow 16. As a result, for example, the blocking element 15 drops into the corresponding recess 14.

In a second step S2 the blocking element 15 is moved by the positive engine torque into abutment with the wall 21 and closed thereby and/or held in the recess 14 and thus in the second blocking position. In this case, the actuation element 10 is moved, in particular rotated back, such that the actuation element 10 comes into the first coupling position and as a result allows a movement of the blocking element 7 from the first release position into the first blocking position. In the initial state A in the first step S1 the blocking element 7 is in the first release position.

In a third step S3 the drive motor which is configured, for example, as an internal combustion engine, returns to its coasting mode, whereby for example the blocking element 7 is subjected to load, in particular, since for example the wall 13 comes into supporting contact with the blocking element 7. Moreover, for example, the blocking element 15 is relieved of load since, for example, the wall 21 moves away from the blocking element 15. In particular in the case of the push downshift it is provided that from the initial state A the drive motor provides a positive engine torque. Thus, for example, the step S3 may be dispensed with, wherein alternatively or additionally, for example, the brake which is mentioned above and which is, in particular, configured as a clutch, in the first step S1 continues to provide a positive output torque.

Figure 5:
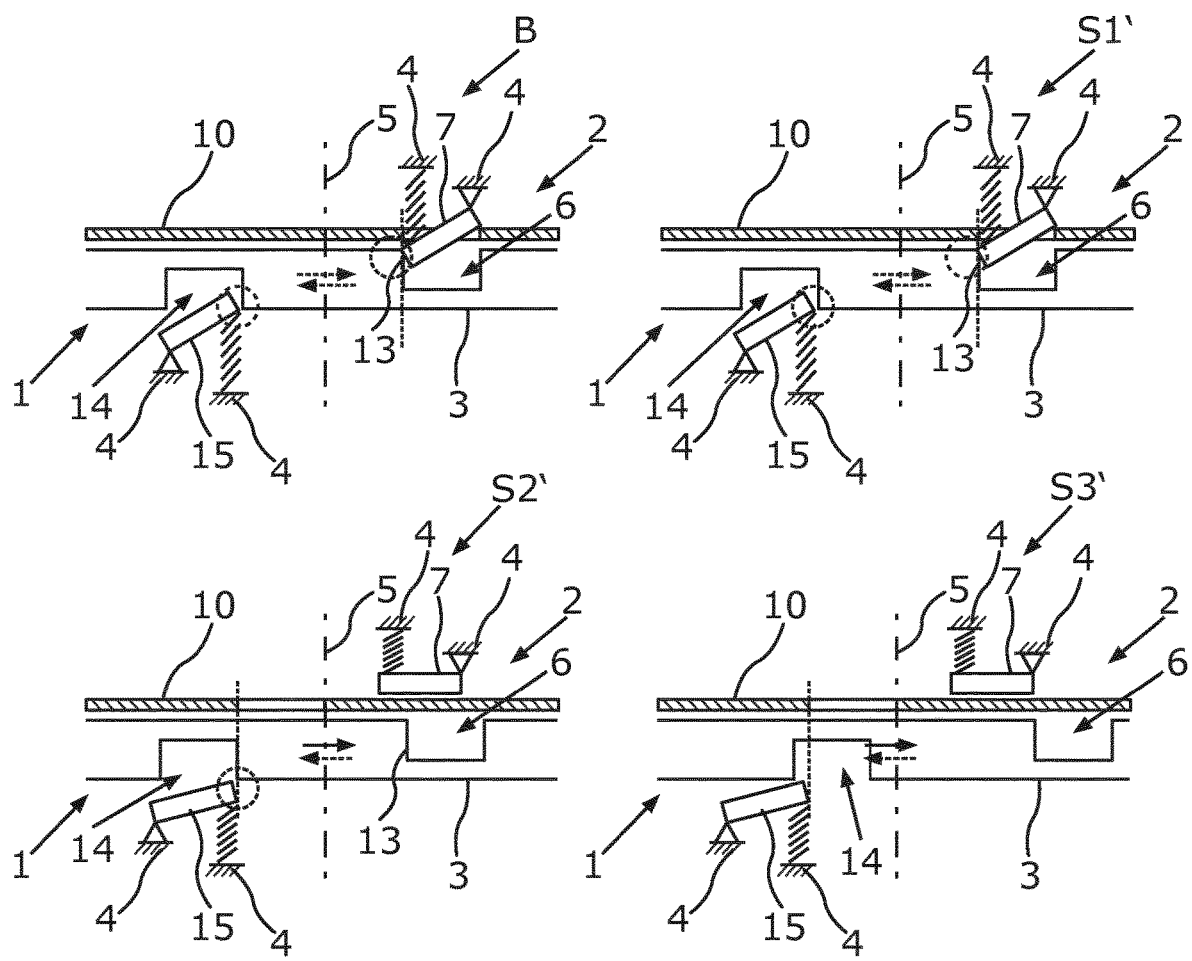
FIG. 5 shows in detail schematic plan views of the clutch device, wherein the method is described with reference to FIG. 5.

With reference to FIG. 5, for example, a push upshift is described. In the context of such a push upshift, for example during the coasting mode of the drive motor, a shifting takes place from the first gear into the second gear. In an initial state B, the blocking elements 7 and 15 are in the blocking positions, wherein for example the blocking element 7 is subjected to load. The blocking element 7 may, for example, be relieved of load by the drive motor providing a positive engine torque (positive torque). Thus, for example in the context of the push upshift, in a first step S1' it is provided that a positive engine torque, which the drive motor provides via the output shaft, is set. The positive engine torque, for example, in each case is introduced into the transmission and/or into the drive device 2.

Figure 6:
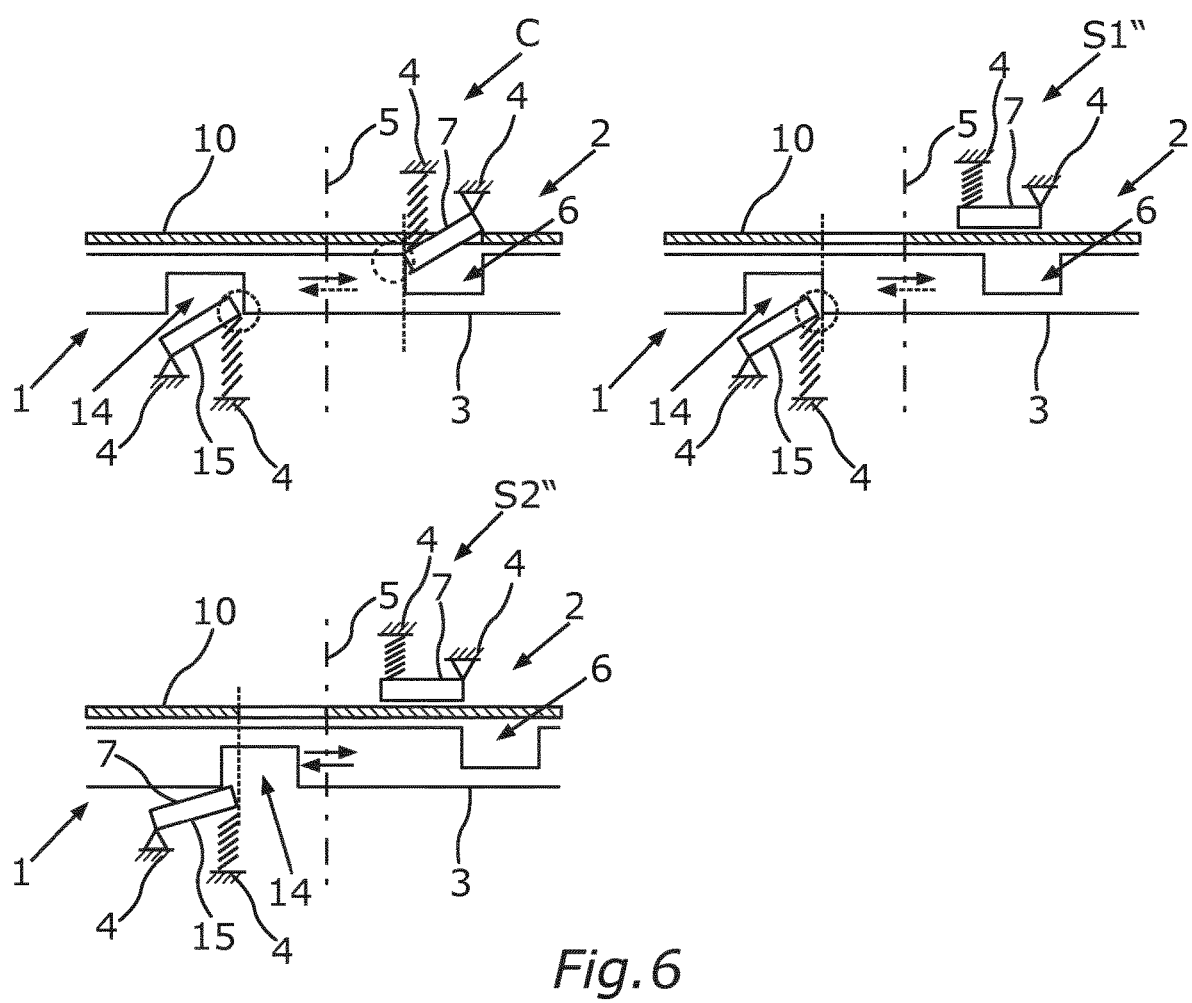
FIG. 6 shows in detail schematic plan views of the clutch device, wherein the method is described with reference to FIG. 6.

In a second step S2' the actuation element 10 is moved, in particular rotated back, such that the actuation element 10, which in the initial state B and in the first step S1' is in the first coupling position, passes into the first decoupling position. In this case, the blocking element 7 is moved, for example by means of the actuation element 10, from the first blocking position into the first release position. This may be implemented, for example, in a simple manner in that in the first step S1' the positive engine torque has been set and as a result the blocking element 7 has been relieved of load, in particular such that for example the wall 13 is moved away from the blocking element 7. In a third step S3' therefore, from the second gear the overrun mode of the blocking element 15 is present, in particular, with a drag torque on the blocking element 15. For example, the initial state A is set in the or by the third step S3'. By the use of the actuation element 18, for example, it is possible in the third step S3' and/or in the initial state A to hold the blocking element 15 in the second release position so that, for example, in the aforementioned overrun mode the shaft 3 does not come into contact with the blocking element 15. As a result, noises and friction between the shaft 3 and the blocking element 15 may be avoided. As a result, the internal friction and thus loss torques in the drive device 2 may be kept to a particularly small level, so that a particularly low energy-consuming, in particular low fuel-consuming, operation is able to be embodied. With reference to FIG. 6, for example, a pull upshift is illustrated, in particular from the first gear into the second gear. A pull upshift is to be understood, in particular, as an upshift during the traction mode of the drive motor.

In an initial state C of the pull upshift, for example, initially the blocking element 7 is relieved of load, so that for example in a first step S1" the actuation element 10 may be moved in a particularly simple manner from the first coupling position into the first decoupling position, whereby the blocking element 7 is moved from the first blocking position into the first release position. For example in a second step S2", therefore, from the second gear the overrun mode of the blocking element 15 is present with a drag torque on the blocking element 15.

Figure 7:
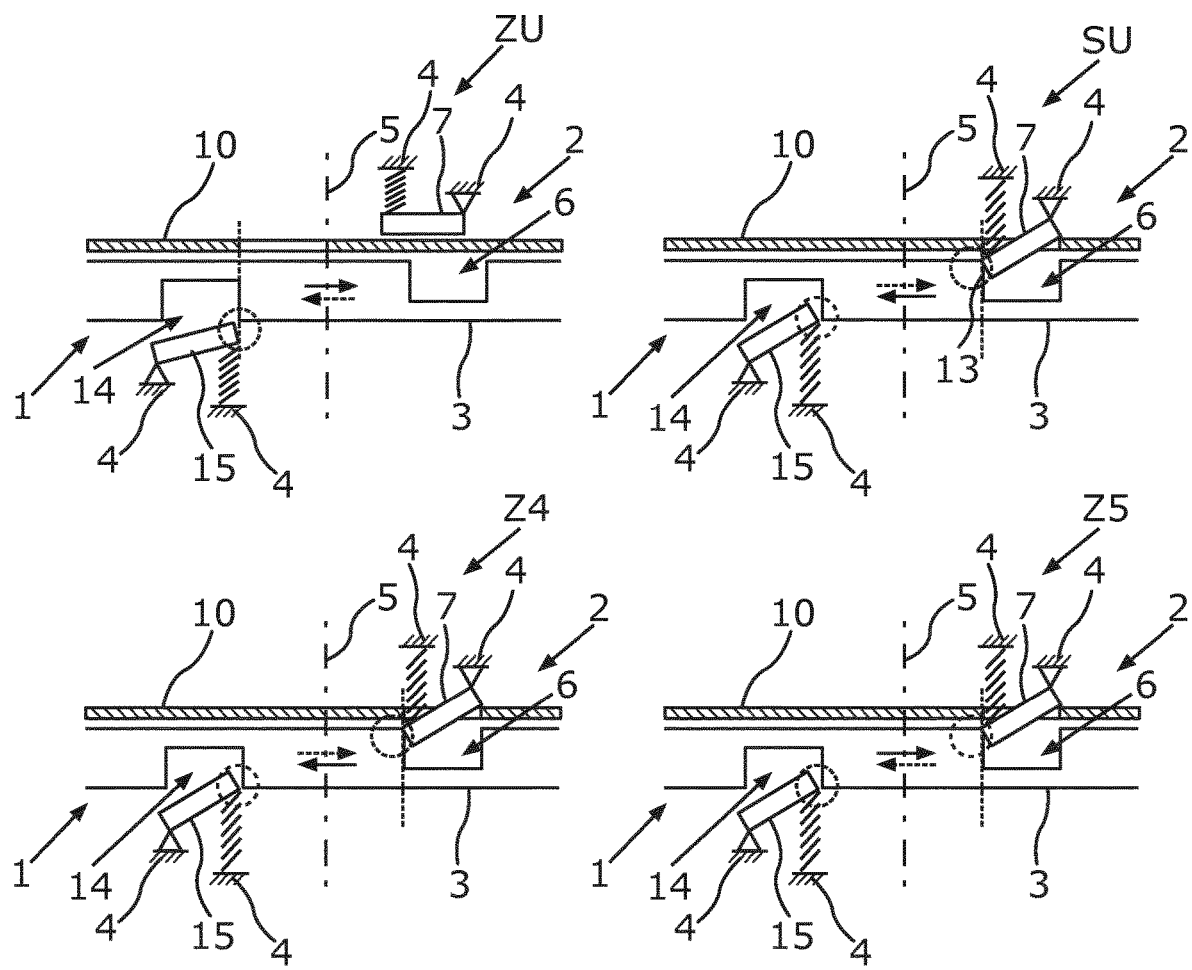
FIG. 7 shows in detail schematic plan views of the clutch device, wherein the method is further described with reference to FIG. 7.

Finally a traction transmission ZU in the first gear is illustrated with reference to FIG. 7. Moreover a thrust transmission SU in the first gear is illustrated in FIG. 7. In a further state Z4, for example, a traction mode is provided whilst a reverse gear of the transmission is provided, wherein for example the state Z4 corresponds to the thrust transmission SU in the first gear. Moreover, a state Z5 is illustrated in FIG. 7 in which, for example, a coasting mode is present whilst the reverse gear is engaged. In this case, for example, the state Z5 corresponds to the traction transmission ZU in the first gear.

As a whole, it may be identified that by the use of blocking elements 7 and 15 and by the use of the actuation elements 10 and 18 when the first gear is engaged, a coasting mode may be implemented in which for example at least one electrical machine, not shown in the figures, is driven by the rotating wheels of the moving motor vehicle. Thus the electrical machine is driven by kinetic energy of the moving motor vehicle, wherein the electrical machine is operated, for example, in a generator mode and thus as a generator. As a result, at least a portion of the kinetic energy of the motor vehicle is converted by means of the generator into electrical energy and/or electrical current which is also denoted as recuperation. Thus, for example, the generator mode is a recuperation mode of the electrical machine, wherein the recuperation mode may be implemented particularly advantageously in the first gear, in particular, by setting the third operating state Z3.

As a result, a particularly efficient operation may be implemented. As a whole, it is possible to implement the advantageous operation of the drive device 2 with only a small degree of effort, wherein a drag torque reduction, a cost saving and a weight reduction may be implemented in comparison with conventional drive devices. In particular, it is possible to avoid undesired frictional contact between the shaft 3 and the blocking elements 7 and 15, in particular in the first operating mode Z1, whereby in particular in the first operating mode Z1 undesired drag torques may be eliminated.

The actuator 22 is, for example, a hydraulically and/or electrically operable actuator so that, for example, the respective actuation element 10 and/or 18 is hydraulically and/or electrically movable.

As may be identified particularly clearly in FIGS. 1 to 3, the through-openings 11 and 19 have lengths and/or dimensions which are different from one another, running in the peripheral direction of the actuation elements 10 and 18 and/or in the respective rotational direction, wherein the through-opening 19 in the respective rotational direction is longer and/or has a greater dimension than the through-opening 11. An opening of the actuation elements 10 and 18 is provided by the through-openings 11 and 19, wherein due to the different lengths, for example, it is possible that the blocking element 15 passes through the through-opening 19 and thus is in the second blocking position whilst the blocking element 7 is still held by means of the actuation element 10 in the first release position.

LIST OF REFERENCE NUMERALS

1 Clutch device
2 Drive device
3 Shaft
4 Housing
5 Rotational axis
6 Recess
7 Blocking element
8 Pivot axis
9 Spring element
10 Actuation element
11 Through-opening
12 Wall
13 Wall
14 Recess
15 Blocking element
16 Arrow
17 Pivot axis
18 Actuation element
19 Through-opening
20 Wall
21 Wall
22 Actuator
23 Front face
24 Front face
25 Arrow
26 Arrow
27 Surface
28 Wall
29 Wall
30 Arrow
31 Spring element
A Initial state
B Initial state
C Initial state
S1, S1', S1" First step
S2, S2', S2" Second step
S3, S3' Third step
SU Thrust transmission
Z1 First operating state
Z2 Second operating state
Z3 Third operating state
Z4 State
Z5 State
ZU Traction transmission

What is claimed is:

1. A clutch device for at least temporarily rotationally fixing at least two components, comprising:
   at least one first recess provided on a first side of a first component of the at least two components, wherein a second component is a housing and the first component is a shaft at least partially accommodated in the housing;
   at least one first blocking element which is configured to be connected to the second component and is movable between at least one first blocking position and at least one first release position;
   at least one first actuation element which has at least one first through-opening for the at least one first blocking element and is movable relative to the at least one first blocking element between at least one first decoupling position in which the at least one first actuation element holds the at least one first blocking element in the at least one first release position, and at least one first coupling position, in which the at least one first actuation element allows a movement of the at least one first blocking element out of the at least one first release position and into the at least one first blocking position, the at least one first blocking element being arranged completely outside of the at least one first recess in the at least one first release position and engaging into the at least one first recess in the at least one first blocking position, thereby passing through the at least one first through-opening in order to thereby rotationally fix the at least two components together in a first rotational direction, wherein at least one second recess is provided on a second side of the first component that is opposite to the first side,
   at least one second blocking element which is connectable to the second component and which is movable between at least one second blocking position and at least one second release position; and
   at least one second actuation element which has at least one second through-opening for the at least one second blocking element and which is movable relative to the at least one second blocking element between at least one second decoupling position holding the at least one second blocking element in the at least one second release position and at least one second coupling position allowing a movement of the at least one second blocking element from the at least one second release position into the at least one second blocking position, wherein
   the at least one second blocking element in the at least one second release position is arranged completely outside of the recesses and in the at least one second blocking position engaging in the at least one second recess by passing through the at least one second through-opening in order thereby to fix together rotationally the components in a second rotational direction opposite to the first rotational direction.

2. The clutch device according to claim 1, wherein the actuation elements are connected together and, as a result, are movable together between the respective coupling position and the respective decoupling position.

3. The clutch device according to claim 2, further comprising: an actuator which is common to the actuation elements, wherein the actuation elements are movable thereby being configured to move together between the respective coupling position and the respective decoupling position.

4. The clutch device according to claim 3, wherein the at least one first blocking element is arranged in the at least one first release position completely outside of the at least one second recess.

5. The clutch device according to claim 4, wherein the recesses are respectively arranged on opposite sides relative to different faces of the first component.

6. The clutch device according to claim 5, wherein the at least one first recess is open in a first direction and the at least one second recess is open in a second direction opposite to the first direction.

7. The clutch device according to claim 6, wherein the at least one blocking elements are respectively arranged on opposite sides relative to different faces of the first component.

8. The clutch device according to claim 7, wherein the clutch device has a first operating state in which the actuation elements are simultaneously in the respective decoupling positions, so that the at least one blocking elements are held simultaneously via the actuation elements in the respective release positions.

9. The clutch device according to claim 8, wherein the clutch device has a second operating state in which the at least one first actuation element is in the first decoupling position and the at least one second actuation element is in the second coupling position, so that the at least one first blocking element is in the at least one first release position and the at least one second blocking element is in the at least one second blocking position.

10. The clutch device according to claim 9, wherein the clutch device has a third operating state in which the actuation elements are simultaneously in the respective coupling positions so that the at least one blocking elements are simultaneously in the respective blocking positions.

11. A drive device for a motor vehicle, comprising:
at least one first component;
at least one second component, wherein the at least one second component is a housing and the at least one first component is a shaft at least partially accommodated in the housing, in particular of a transmission;
at least one clutch device configured to at least temporarily rotationally fix the at least one first and at least one second components, wherein the clutch device has:
at least one first recess provided on a first side of the at least one first component;
at least one first blocking element which is connected to the at least one second component and which is movable between at least one first blocking position and at least one first release position; and
at least one first actuation element which has at least one first through-opening for the at least one first blocking element and which is movable relative to the at least one first blocking element between at least one first decoupling position holding the at least one first blocking element in the at least one first release position and at least one first coupling position allowing a movement of the at least one first blocking element from the at least one first release position into the at least one first blocking position, the at least one first blocking element in the at least one first release position being arranged completely outside of the at least one first recess and in the at least one first blocking position engaging in the at least one first recess by passing through the at least one first through-opening, whereby the at least one first and at least one second components are rotationally fixed together in a first rotational direction, wherein
at least one second recess is provided on a second side of the at least one first component that is opposite to the first side;
at least one second blocking element is connected to the at least one second component and is movable between at least one second blocking position and at least one second release position; and
at least one second actuation element which has at least one second through-opening for the at least one second blocking element and which is movable relative to the at least one second blocking element between at least one second decoupling position holding the at least one second blocking element in the at least one second release position and at least one second coupling position allowing a movement of the at least one second blocking element from the at least one second release position into the at least one second blocking position, said at least one second blocking element in the at least one second release position being arranged completely outside of the at least one first and at least one second recesses and in the at least one second blocking position engaging in the at least one second recess by passing through the at least one second through-opening, whereby the at least one first and at least one second components are rotationally fixed together in a second rotational direction opposite the first rotational direction.

* * * * *